UNITED STATES PATENT OFFICE.

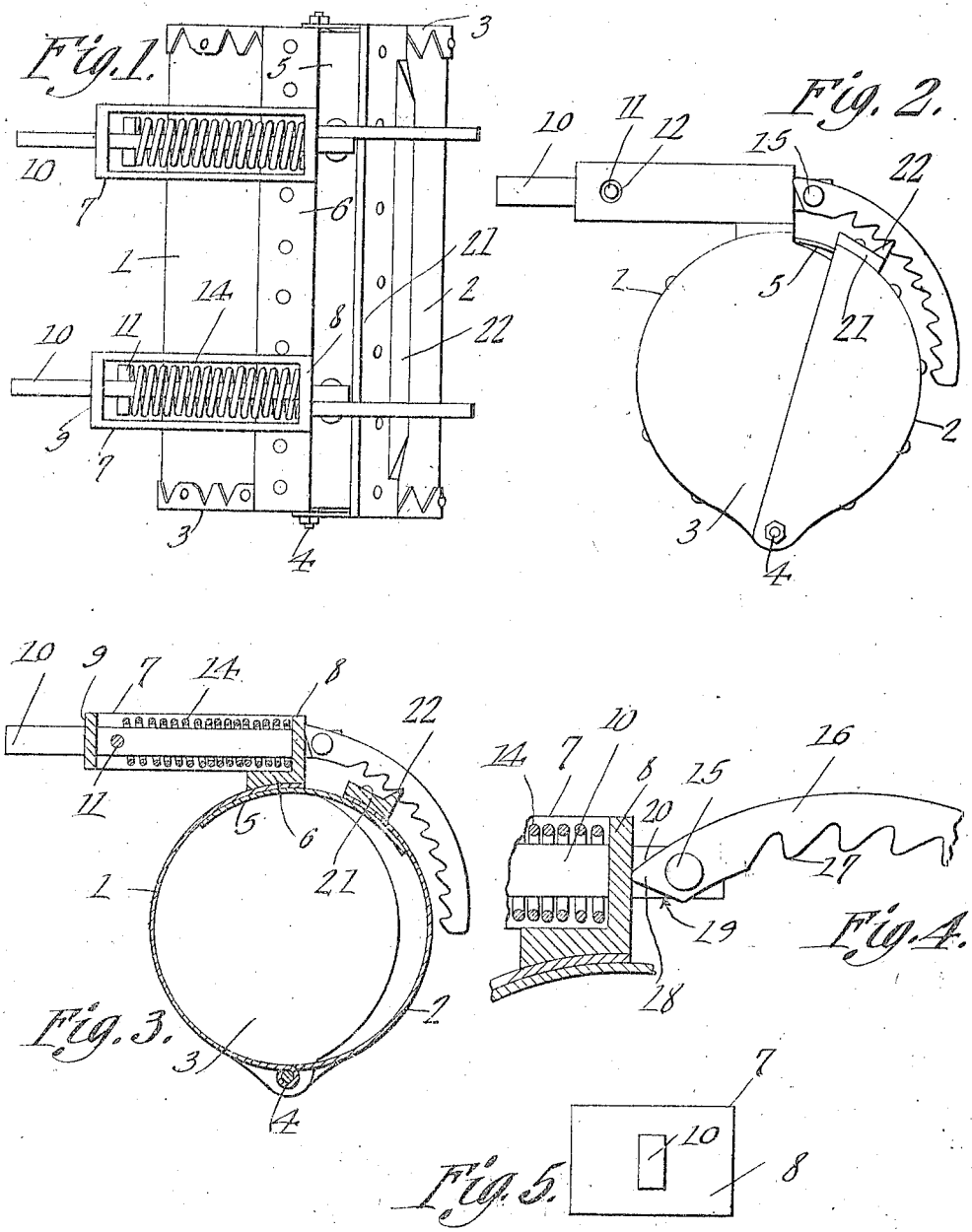

ALEXANDER RISPEL, OF CHICAGO, ILLINOIS.

MEAT-COMPRESSOR.

1,208,013.

Specification of Letters Patent.  Patented Dec. 12, 1916.

Application filed November 17, 1915. Serial No. 62,016.

*To all whom it may concern:*

Be it known that I, ALEXANDER RISPEL, a citizen of the United States, residing at Chicago, in the county of Cook and State of Illinois, have invented a new and useful Meat-Compressor, of which the following is a specification.

The device forming the subject matter of this application is adapted to be employed for compressing meat and for holding meat while the same is being boiled.

The present invention aims to provide novel means whereby relative movement may be secured between the members of the compressor to effect a compressing of the meat.

Another object of the invention is to provide a novel form of latch which constitutes at once a means for holding the constituent members of the compressor together, and a means whereby may be manipulated, a spring which constitutes a part of the means for drawing the members of the compressor together.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 is a top plan; Fig. 2 is an end elevation; Fig. 3 is a cross section, the latch being in locked relation with respect to the keeper; Fig. 4 is a fragmental transverse section, on an enlarged scale, wherein the latch is shown in its intermediate position; Fig. 5 is an end elevation of one of the casings, distance parts being omitted.

The compressor forming the subject matter of this application preferably is fashioned from metal throughout and comprises a pair of trough-shaped members 1 and 2 embodying overlapped end walls 3, the lower edges of the members 1 and 2 being united by means of a pivot rod 4, so that the said members may be swung toward and away from each other. The space between the upper edges of the trough-shaped members 1 is bridged across by an arcuate closure plate 5, the same being removable and, ordinarily, being held in place by the meat within the members 1 and 2.

Attached to the upper longitudinal edge of the trough-shaped member 1 is a bar 6 provided with any desired number of outwardly extended, box-like casings 7 open at the top and at the bottom, each casing 7 embodying a front wall 8 and a rear wall 9. Slidable through openings in the front wall 8 and in the rear wall 9 of each casing 7 is a plunger 10 which preferably is of rectangular cross section, as indicated in Fig. 5, the openings in the walls 8 and 9 being shaped accordingly, so that the plunger 10 will not rotate. Extended through the plungers 10 and located within the casings 7 are abutments in the form of pins 11, one of the side walls of each casing 7 having an opening 12 through which the abutment pin 11 may be inserted into the plunger 10. Strong compression springs 14 are located within the casings 7 and around the plungers 10, the forward ends of the springs 14 abutting against the front walls 8 of the casings, and the rear ends of the springs abutting against the pins 11.

Ahead of the front walls 8 of the casings 7, the plungers 10 carry pivot elements 15 upon which are mounted to swing latches 16 equipped with teeth 17 adapted to engage the flange 22 of a keeper bar 21 attached to the trough-shaped member 2 adjacent the longitudinal edge thereof. The rear ends of the latches 16 are pointed to form cams 18 defining in the latches 16, lower inclined edges 19, and upper edges 20.

In practical operation, when the latches 16 are closed down into engagement with the keepers 21—22, as shown in Fig. 3, the pointed cams 18 bear upon the forward walls 8 of the casings 7 above the centers of the pivot elements 15. The springs 14, thrusting rearwardly against the abutment pins 11 and coacting with the front walls 8 of the casings 7 tend to throw the outer or free ends of the latches 16 downwardly and to maintain the teeth 17 on the latches engaged with the flange 22 of the keeper bar 21. Further, the springs 23 tend to thrust the plungers 10 rearwardly, and to draw the latches 16 rearwardly, the function of the springs, therefore, being to swing the trough-shaped members 1 and 2 toward each other thereby effecting a compression of the meat within the members 1 and 2.

When it is desired to swing the latches 16 into opened positions, the cams 18 engage with the front walls 8 of the casings 7 and effect a compression of the springs 14. When the latches 16 have been swung upwardly beyond the positions shown in Fig. 4, the edges 20 of the latches come into contact with the front walls 8 of the casings 7, and the springs 14 react on the plungers 10 to hold the latches 16 in upstanding, unlocked positions. Because the lower rear edge of each latch 16 is beveled as shown at 19, the latch 16 may be swung downwardly to a position slightly beyond the position shown in Fig. 3, a contingency arising when the longitudinal edges of the trough-shaped members 1 and 2 are spaced apart less widely than shown in Fig. 3.

Having thus described the invention, what is claimed is:—

1. A meat compressor comprising a pair of pivotally connected, trough-shaped members; a casing on one member; a keeper on the other member; a plunger mounted to slide in the casing; an abutment on the plunger; a spring interposed between the abutment and the forward end of the casing; and a latch pivoted to the plunger and provided with means for engaging the keeper, the latch terminating at its inner end in a cam coacting with the casing to effect a compression of the spring when the latch is moved to an unlocked position with respect to the keeper, the cam coacting with the casing to hold the latch engaged with the keeper when the latch is in a locked position with respect to the keeper.

2. A meat compressor comprising a pair of pivotally connected, trough-shaped members; a keeper on one member; a plunger mounted to slide with respect to the other member; a latch pivoted to the plunger and provided with means for engaging the keeper; means for supporting the plunger slidably; and a spring coöperating with said means and the plunger, the latch being provided with a cam engaging said means.

3. A meat compressor embodying a pair of pivotally connected, trough-shaped members; a keeper carried by one of said members; a latch pivotally and slidably carried by the other of said members and adapted to coact with the keeper; and spring means for drawing the latch circumferentially of both members, to effect relative compressive movement between said members.

In testimony that I claim the foregoing as my own, I have hereto affixed my signature in the presence of two witnesses.

ALEXANDER RISPEL.

Witnesses:
LOUIS LIEDTKE,
IRA BRUECKNER.